W. JONES.
Vehicle-Axle Lubricators.
No. 148,368.        Patented March 10, 1874.
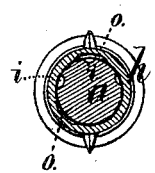
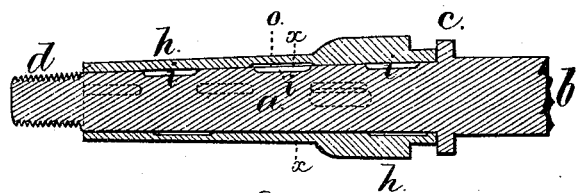
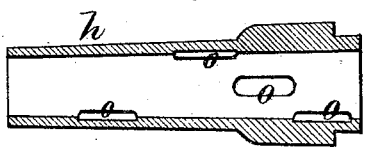

UNITED STATES PATENT OFFICE.

WILLIS JONES, OF BROOKLYN, E. D., NEW YORK.

IMPROVEMENT IN VEHICLE-AXLE LUBRICATORS.

Specification forming part of Letters Patent No. 148,368, dated March 10, 1874; application filed September 20, 1873.

*To all whom it may concern:*

Be it known that I, WILLIS JONES, of Brooklyn, E. D., in the county of Kings and State of New York, have invented an Improvement in Axles for Vehicles, of which the following is a specification:

Heretofore axles have been made with a groove, either longitudinally or spirally, the object being to contain lubricating material or convey it from a supply-chamber to the bearing-surfaces. Grooves of this kind are liable to injure the box, and, under the heavy strain and concussion to which axles are often subjected upon large express carts, wagons, &c., the axle is liable to heat and cut out, as the lubricating material runs out at one end of this groove and escapes.

My invention is made with special reference to lubricating the axles of large, heavy wheels, but may be used on all characters of vehicle-axles; and consists in alternating cavities in the axles, disposed in such positions that the lubricating material introduced in such cavities will reach all parts of the inside of the box, but will not waste out of the cavities; hence the axle cannot get heated unless all the lubricant is exhausted, and, in placing the grease upon the axle, these cavities retain the same, and prevent its being scraped off by the box as it is introduced upon the axle.

In the drawing, Figure 1 is a plan, showing the upper side of the axle. Fig. 2 is a vertical longitudinal section of the axle and box. Fig. 3 is a separate longitudinal section of the axle-box, and Fig. 4 is a cross-section at the line $x\ x$.

The axle $a$ is at the end of the axle-bar $b$, and the collar $c$ is provided, as usual, and also the screw end $d$. The cavities $i\ i$ are in the surface of the axle $a$, and are not continuous, but are comparatively short and positioned alternately, so that the cavities in one row are opposite the spaces between the cavities in the next row.

By this arrangement of the cavities the lubricating material in these cavities comes into contact with all portions of the interior of the pipe or axle box, and the axle itself is not weakened.

The greatest strain is upon the under side of the axle. Hence, where the grooves run longitudinally or transversely, the axle is liable to wear or cut under heavy pressure.

The upper part of the axle, being subject only to a compressing strain, will not be weakened, for the duty required by cavities of sufficient size to contain lubricating material, especially when such cavities are in the upper part of the axle. Hence my improvement is of great value for heavy vehicles, where the lubricant is liable to be expelled by the pressure or run-away, and the axle become heated and injured in a very short time.

I prefer to use the said axle with the axle-box shown in Figs. 3 and 4, the same having cavities in the interior of about the size and arranged as shown.

I am aware that the interior of an axle pipe or box has been made with grooves running longitudinally to receive lubricating material. This pipe, as it revolves, empties the lubricating material from the cavities, causing the same to work out rapidly from the box. In my improvement the cavities, being in the upper part of the stationary axle, retain the oil, but it is drawn out by capillary action as required. In cases where the axle is grooved longitudinally and circumferentially, the oil is not retained; neither is it retained when the grooves are spiral around the axle.

I claim as my invention—

The axle for a wheel-hub, made with recesses in the upper part of such axle, running longitudinally and alternated, in the manner and for the purposes set forth.

Signed by me this 16th day of September, 1873.

WILLIS JONES.

Witnesses:
 GEO. D. WALKER,
 GEO. T. PINCKNEY,
 CHAS. H. SMITH.